(12) United States Patent
Bang

(10) Patent No.: US 7,530,711 B2
(45) Date of Patent: May 12, 2009

(54) BACKLIGHT ASSEMBLY AND LIQUID CRYSTAL DISPLAY MODULE USING THE SAME

(75) Inventor: Ju-Young Bang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/509,650

(22) Filed: Aug. 25, 2006

(65) Prior Publication Data
US 2007/0070625 A1 Mar. 29, 2007

(30) Foreign Application Priority Data
Dec. 28, 2005 (KR) .................. 10-2005-0131721

(51) Int. Cl.
F21V 7/00 (2006.01)

(52) U.S. Cl. ............... 362/241; 362/227; 362/235; 362/240; 362/612; 362/800

(58) Field of Classification Search ........... 362/612, 362/623, 632–634, 227, 235, 240, 241, 247, 362/800; 313/2.1; 345/82, 83
See application file for complete search history.

(56) References Cited

U.S. PATENT DOCUMENTS

| 6,871,982 B2 * | 3/2005 | Holman et al. ............. 362/331 |
| 6,974,229 B2 * | 12/2005 | West et al. ................. 362/227 |
| 2005/0276066 A1 * | 12/2005 | Kim et al. .................. 362/561 |
| 2006/0002146 A1 * | 1/2006 | Baba ......................... 362/613 |
| 2006/0007553 A1 * | 1/2006 | Bogner et al. ............. 359/630 |
| 2006/0012989 A1 * | 1/2006 | Lee ........................... 362/231 |
| 2006/0120102 A1 * | 6/2006 | Lim .......................... 362/561 |
| 2006/0279946 A1 * | 12/2006 | Park et al. .................. 362/97 |
| 2007/0103908 A1 * | 5/2007 | Tabito et al. ............... 362/294 |

FOREIGN PATENT DOCUMENTS

KR 10-2005-0093919 9/2005

* cited by examiner

Primary Examiner—Sandra L. O'Shea
Assistant Examiner—Meghan K. Dunwiddie
(74) Attorney, Agent, or Firm—Holland & Knight LLP

(57) ABSTRACT

A backlight assembly includes light emitting diodes in patterns, a reflective sheet having a plurality of through holes through which the light emitting diodes protrude, and a sidewall dividing the patterns into a plurality of light emitting diode units.

15 Claims, 10 Drawing Sheets

(423.7 nit)　　　　　　　(452.1 nit)

BACKLIGHT ASSEMBLY AND LIQUID CRYSTAL DISPLAY MODULE USING THE SAME

The present invention claims the benefit of Korean Patent Application No. P2005-0131721, filed in Korea on Dec. 28, 2005, which is hereby incorporated by reference in its entirety.

BACKGROUND OF THE INVENTION

1. Field of the Invention

The present invention relates to a light source, and more particularly, a backlight assembly including a plurality of light emitting diodes (LEDs) and a liquid crystal display (LCD) module using the backlight assembly.

2. Discussion of the Related Art

Flat panel display (FPD) devices that have relatively light weight, thin profile, and low power consumption characteristics are being commonly used as a substitute for cathode ray tube (CRT) devices. Generally, display devices may be classified according to their ability for self-emission, and may include emissive display devices and non-emissive display devices. Emissive display devices display images by self-emitting light, while the non-emissive display devices require a light source since they do not emit light by themselves. For example, plasma display panel (PDP) devices, field emission display (FED) devices, and electroluminescent display (ELD) devices are commonly used emissive display devices. Liquid crystal display (LCD) devices may be categorized as non-emissive display devices although some applications do not require a light source. LCD devices are commonly used in notebook and desktop computers because of their high resolution, color display capability, and high quality image.

An LCD module of the LCD devices includes an LCD panel for displaying images to an exterior and a backlight unit for supplying light to the LCD panel. The LCD panel includes two substrates facing and spaced apart from each other, and a liquid crystal material interposed therebetween. Liquid crystal molecules of the liquid crystal material have a dielectric constant and refractive index anisotropic characteristics due to their long thin shape. In addition, two electric field generating electrodes are formed on the two substrates, respectively. Accordingly, an orientation alignment of the liquid crystal molecules can be controlled by supplying a voltage to the two electrodes such that transmittance of the LCD panel is changed according to polarization properties of the liquid crystal material.

Because the LCD panel is a non-emissive-type display device, an additional light source is required. Thus, a backlight unit is disposed under the LCD panel, wherein the LCD device displays images using light produced by the backlight unit. In general, backlight units may be classified into two types according to the disposition of the light source, such as side-type backlight unit and direct-type backlight unit. As display areas of the LCD devices become larger, direct-type backlight units including a plurality of light sources have become more commonly used in order to provide more light. Generally, discharge lamps, such as a cold cathode fluorescent lamps (CCFL) or external electrode fluorescent lamps (EEFL), are used as a light source of the backlight unit. However, light emitting diodes (LEDs) are gradually being used more often as the light source of the backlight unit to improve color reproducibility and to increase brightness of the display.

Figure 1:
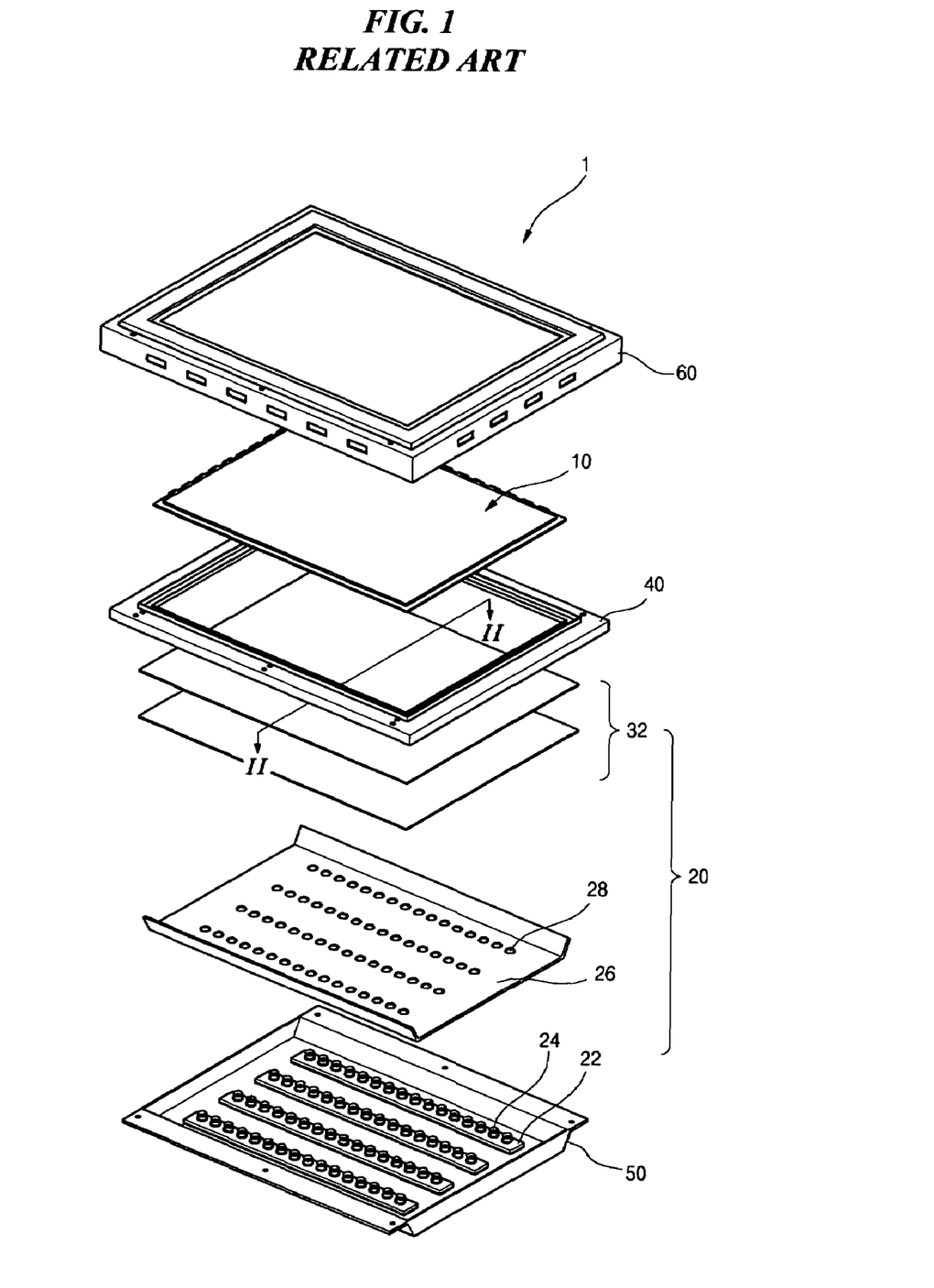
FIG. 1 is an assembly view of an LCD module using a backlight assembly according to the related art.
Figure 2:
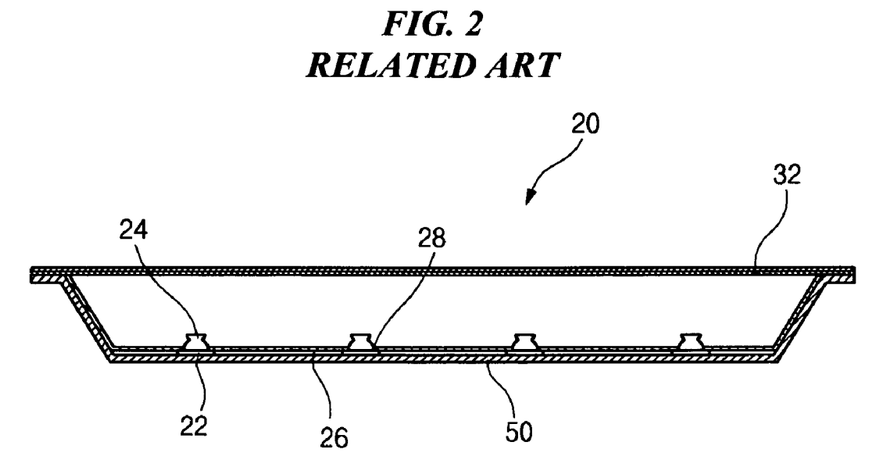
FIG. 2 is a schematic cross-sectional view taken along a line "II-II" of FIG. 1.

FIG. 1 is an assembly view of an LCD module using a backlight assembly according to the related art. FIG. 2 is a cross-sectional view taken along line "II-II" of FIG. 1. As shown in FIGS. 1 and 2, an LCD panel 10 and a backlight unit 20 are assembled with mechanical structural elements to protect the lighting components and to prevent light leakage from the assembled LCD module 1. Generally, the LCD panel 10, the backlight unit 20, and the mechanical structural components may all be collectively referred to as an LCD module 1.

A main frame 40, which is square or rectangular, is a structural component that surrounds the edges of the LCD panel 10 and the backlight unit 20 in the LCD module 1. Another structural component is a bottom frame 50 provided on a bottom surface of the backlight unit 20 to provide structural support and to prevent light leakage from the unit when which is combined with the main frame 40. Further, a top frame 60 is a structural component that surrounds a front edge of the LCD panel 10. The LCD module 1 is assembled and held together by the main frame 40, the bottom frame 50, and the top frame 60.

The backlight unit 20 further includes a plurality of printed circuit boards (PCBs) 22 disposed along an inner surface of the bottom frame 50, a plurality of light emitting diodes (LEDs) 24 packaged on the PCBs 22, a reflective sheet 26 having a plurality of through holes 28 corresponding to the plurality of LEDs 24 and contacting the PCBs 22 and the bottom frame 50, and a plurality of optical sheets 32 covering the plurality of LEDs 24 with the reflective sheet 26 therebetween. Light from the plurality of LEDs 24 transmits directly toward the LCD panel 10 or is reflected by the reflective sheet 26 toward the LCD panel 10, and then the light is altered through the plurality of optical sheets 32. The altered light is transmitted to the LCD panel 10, which allows the LCD panel 10 to display a bright image with white light. For example, red (R), green (G) and blue (B) LEDs emitting red, green and blue colors, respectively, are arranged in a predetermined manner so that the red, green and blue colors mix into white light. Although not shown, the optical sheet 32 may include a diffuser sheet and a prism sheet.

As shown in FIG. 2, in the backlight assembly 20, light (not shown) from the LEDs 24 transmit directly toward the LCD panel 10 or is reflected by the reflective sheet 26 toward the LCD panel 10, and then the light transmits through the optical sheet 32 and enters the liquid crystal panel 10 (of FIG. 1) as a light source.

This backlight assembly 20 has several disadvantages. Generally, the light output of the LEDs 24 is smaller than a fluorescent lamp (not shown) by about one-third. Therefore, the brightness of the LEDs 24 is lower than a fluorescent lamp. To solve this brightness problem, the number of the LEDs 24 is increased so as to provide an image quality with the same brightness as if a fluorescent lamp was used. However, the increased number of LEDs increases the cost and power consumption of a backlight unit. For example, in the case of an LCD television or monitor greater than 20 inches, space between adjacent fluorescent lamps is in a range of about 20 mm to about 25 mm while a space between the LEDs 24 in a row is in a range of about 65 mm to about 100 mm under the same cost condition. Further, in the case of the LEDs 24, dimming lines may appear between adjacent LEDs 24. Thus, it is difficult to obtain a high contrast due to weak brightness in a space between adjacent LEDs 24.

The backlight assembly 20 should have an enough space between the LEDs 24 and the optical sheet 32 to obtain an enough color mixing space and to increase the divergence angle of the LEDs 24. A diffuser member (not shown) interposed between the LEDs 24 and the optical sheet 32 to assist in color mixing and proper divergence. However, the diffuser member may degrade brightness.

To increase brightness and contrast in a specific portion of the LCD panel 10 (of FIG. 1) to show a fast moving object, such as a blasting scene, the backlight assembly 20 can be driven by a division driving method. However, the backlight assembly 20 according to the related art is difficult to be driven in the division driving method. Consequently, the backlight assembly 20 having the plurality of LEDs 24 has problems in both brightness and contrast.

SUMMARY OF THE INVENTION

Accordingly, the present invention is directed to a backlight assembly and an LCD module using the backlight assembly that substantially obviate one or more of the problems due to limitations and disadvantages of the related art.

An object of the present invention is to provide a backlight assembly that can provide high brightness.

An object of the present invention is to provide a backlight assembly that can provide high contrast.

An object of the present invention is to provide an LCD module using a backlight assembly that can provide high brightness.

An object of the present invention is to provide an LCD module using a backlight assembly that can provide high contrast.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a backlight assembly includes light emitting diodes in patterns, a reflective sheet having a plurality of through holes through which the light emitting diodes protrude, and a sidewall dividing the patterns into a plurality of light emitting diode units.

In another aspect, a backlight assembly includes light emitting diodes emitting at least one color and positioned in light emitting diode units, a reflective sheet for reflecting light from the light emitting diodes, and a sidewall that bounds each of the light emitting diode units.

In another aspect, a liquid crystal display module includes a backlight assembly having light emitting diodes emitting at least one color and positioned in light emitting diode units, a reflective sheet for reflecting light for the light emitting diodes, and a sidewall surrounding each of the light emitting diode units, a bottom frame on which the backlight assembly is disposed, a liquid crystal panel disposed over the backlight assembly, a main frame surrounding the liquid crystal panel and the backlight assembly; and a top frame surrounding a front edge of the liquid crystal panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 7A to 7J are schematic plan views showing configurations according to embodiments of the present invention.

DETAILED DESCRIPTION OF THE PREFERRED EMBODIMENTS

Reference will now be made in detail to the preferred embodiments of the present invention, examples of which are illustrated in the accompanying drawings.

Figure 3:
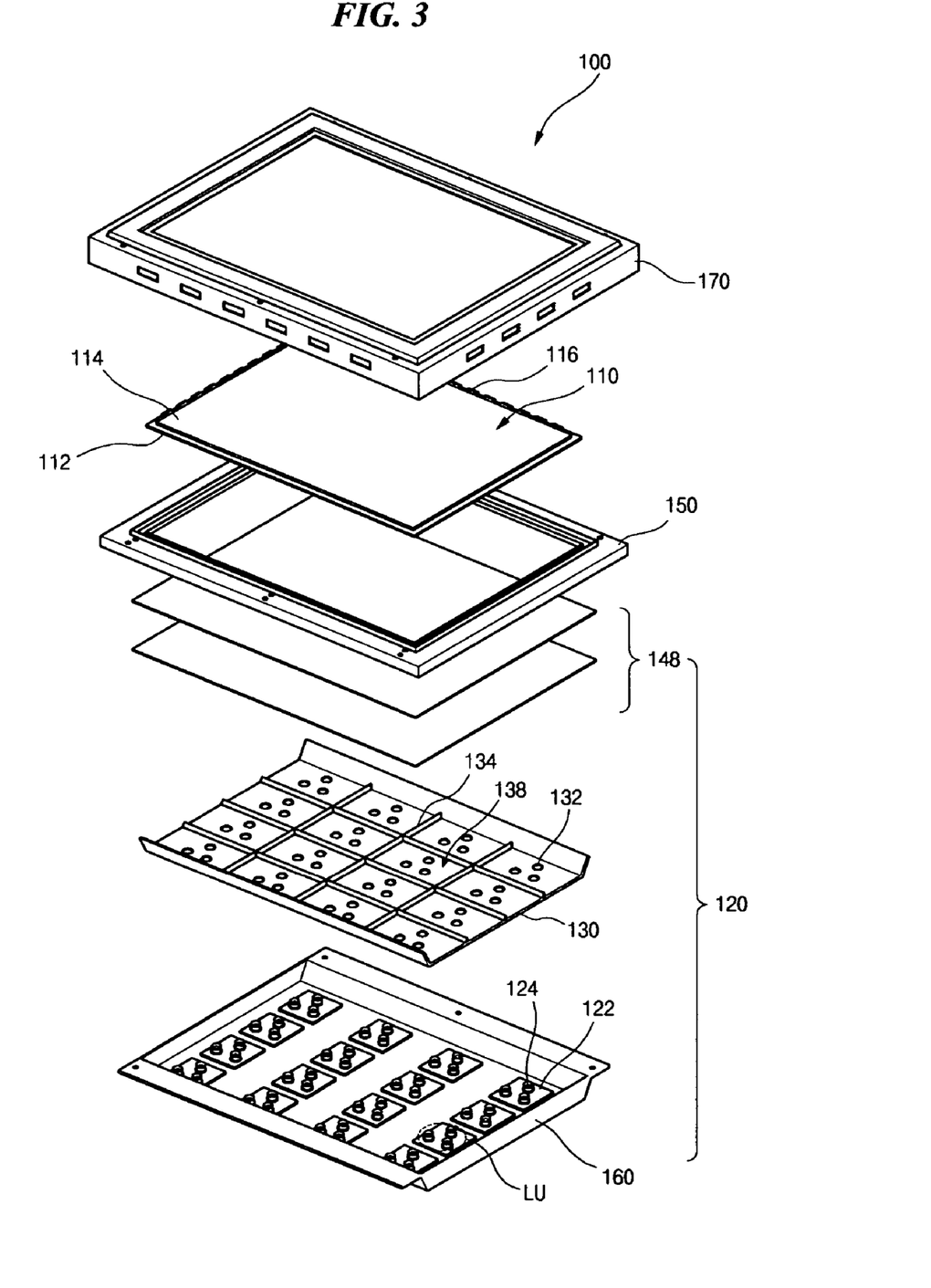
FIG. 3 is an assembly view of an LCD module using a backlight assembly according to an embodiment of the present invention.

FIG. 3 is an assembly view of an LCD module using a backlight assembly according to an embodiment of the present invention. As shown in FIG. 3, an LCD module 100 includes a liquid crystal panel 110 and a backlight assembly 120 under the liquid crystal panel 110. A main frame 150 surrounds edges of the liquid crystal panel 110 and the backlight assembly 120. For example, the main frame 150 can be a stainless use steel (SUS) or plastic mold member. A bottom frame 160 covers a backside of the backlight assembly 120. Further, a top frame 170 surrounds a front edge of the liquid crystal panel 110 and attaches to the bottom frame 160 through the main frame 150. Together, the top frame 170, the main frame 150 and the bottom frame 160 minimize light loss and maintain the shape of the LCD module 100.

The liquid crystal panel 110 includes a first substrate 112, a second substrate 114 facing the first substrate 112 and a liquid crystal layer (not shown) between the first and second substrates 112 and 114. Although not shown, the liquid crystal panel 110 can be an active matrix type including a plurality of gate lines, a plurality of data lines crossing the plurality of gate lines to define a plurality of pixel regions, a thin film transistor at each crossing of the gate lines and the data lines, and a pixel electrode connected to the thin film transistor in each of the pixel regions formed on the first substrate 112. Further, red (R), green (G) and blue (B) sub-color filter layers for each of the pixel regions are formed in a black matrix on the second substrate 114. Furthermore, a common electrode may be formed on the R, G and B sub-color filter layers and the black matrix.

A driving circuit (not shown) is connected to sides of the liquid crystal panel 110 through a flexible printed circuit board (FPCB) (not shown) or a tape carrier package (TCP) 116. The driving circuit is positioned close to a backside of the bottom frame 160. Although not shown, the driving circuit includes a gate driving circuit that applies a scanning signal to the gate line and a data driving circuit that applies a data signal to the data line. The data driving circuit is adjacent to the gate driving circuit.

When the thin film transistor of a pixel region is turned into an ON state by the scanning signal from the gate driving circuit, the data signal is transferred to the corresponding pixel electrode through the data line. Therefore, light transmittance differences through the liquid crystal panel in the ON/OFF states are obtained by changing the arrangement direction of liquid crystal molecules due to a vertical electric field between the pixel electrode and the common electrode.

A backlight assembly 120 is disposed under the liquid crystal panel 110 as a light source for the liquid crystal panel 110. At least one PCB 122 is mounted on the bottom frame 160 of the backlight assembly 120 and a plurality of LEDs 124 is mounted on the PCB 122. The plurality of LEDs emits light toward the liquid crystal panel 110. A reflective sheet 130 covers the PCB 122 and an inner surface of the bottom frame 160 along the sides of the PCB 122. The reflective sheet 130 has a plurality of through holes 132 exposing the plurality of LEDs 124. Each of the plurality of through holes 132 corresponds to each of the plurality of LEDs 124. The reflective sheet 130 is white or silver colored. The plurality of LEDs 124 emit a white colored light by color mixing red, green, and blue light from red, green, and blue LEDs. A white light emitting LED can be used instead of or along with the red, green, and blue LEDs.

A plurality of optical sheets 148 is disposed between the liquid crystal panel 110 and the reflective sheet 130. The plurality of optical sheets 148 are separated from the plurality of LEDs 124 by a predetermined space. Although not shown, the optical sheets 148 may include functional sheets, such as a dual brightness enhancement film (DBEF) as a reflective polarizing film, as well as the diffuser sheet (not shown) and the prism sheet (not shown).

Light from the LEDs 124 is directed toward the liquid crystal panel 110 or is reflected by the reflected sheet 130 to the liquid crystal panel 110, and then the light is modified through the optical sheets 148 as uniform surface light source to enter the liquid crystal panel 110. Accordingly, the liquid crystal panel 110 can display an image having desired brightness.

A sidewall 134 is disposed on the reflective sheet 130 to divide the plurality of LEDs 124 into a plurality of LED units "LU" each emitting a predetermined color. For example, a "LU" unit is three LEDs 124 having a triangular shape, as shown in FIG. 3. The sidewall 134 can have a lattice shape 138 that bounds each of the plurality of LED units "LU." The sidewall 134 can be attached to the reflective sheet 130 or be an integral part of the reflective sheet 130. If the sidewall 134 is attached to the reflective sheet 130, the sidewall 134 can be made of the same material as the reflective sheet 130.

Figure 4A:
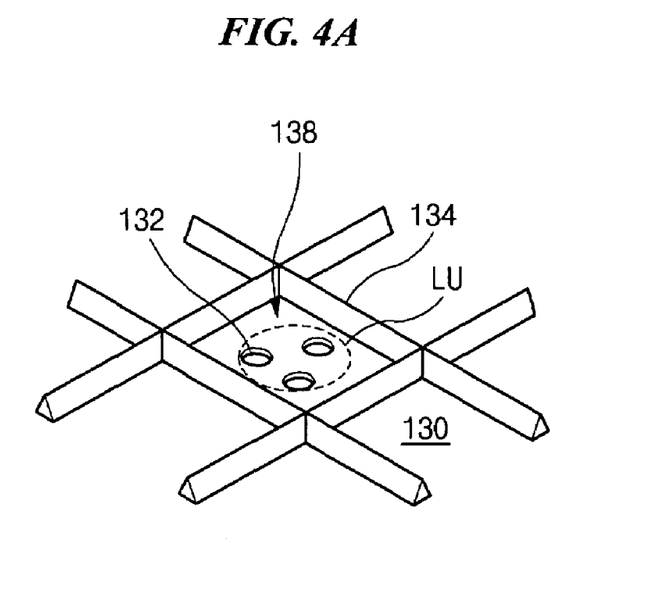
FIGS. 4a and 4b are schematic perspective views showing a reflective sheet and a sidewall according to an embodiment of the present invention.
Figure 4B:
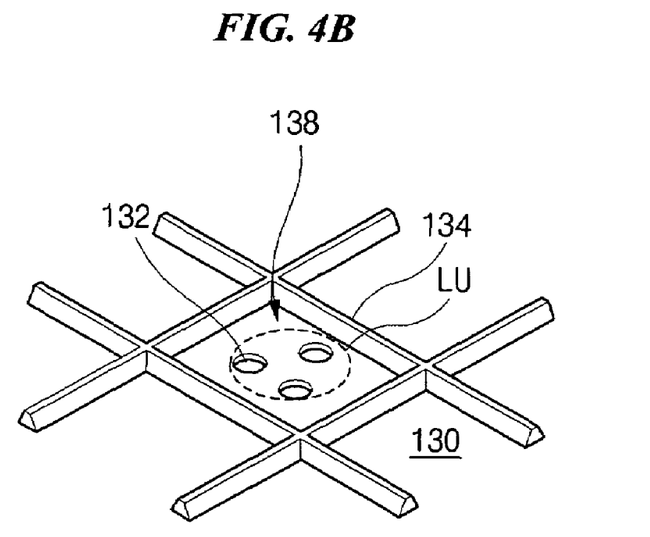

FIGS. 4a and 4b are schematic perspective views showing a reflective sheet and a sidewall according to an embodiment of the present invention. For convenience sake, above mentioned FIG. 3 is referred to along with FIGS. 4a and 4b. As shown in FIGS. 4a and 4b, the sidewall 134 surrounds the plurality of through holes 132 of the reflective sheet 130 for a corresponding LED unit "LU." A cross-sectional view of the sidewall 134 can be a triangle shape, as shown in FIG. 4a or, the cross-sectional view of the sidewall 134 can be a trapezoidal shape, as shown in FIG. 4b. In general, the sidewall has a cross-sectional shape such that a width of the sidewall gradually decreases from the reflective sheet.

As shown in FIGS. 4a and 4b, a group of the plurality of through holes 132 is within the lattice shape 138 defined by the sidewall 134. The sidewall 134 can have a height within range of about 2 mm to 5 mm. The triangular shape of a sidewall 134 in FIG. 4a may be an isosceles triangle. More specifically, the triangular shape of the sidewall 134 may have an angle between the reflective sheet 130 and one of slopes of the sidewall 134 within a range about 100 to 135 degrees. The sidewall 134 may be formed through the same process and using the same material as the reflective sheet 130 or may be attached through the different process from the reflective sheet 130. For example, the sidewall 134 can be an opaque reflective material. In another alternative, the sidewall can be an integral part of the reflective sheet.

Figure 5:
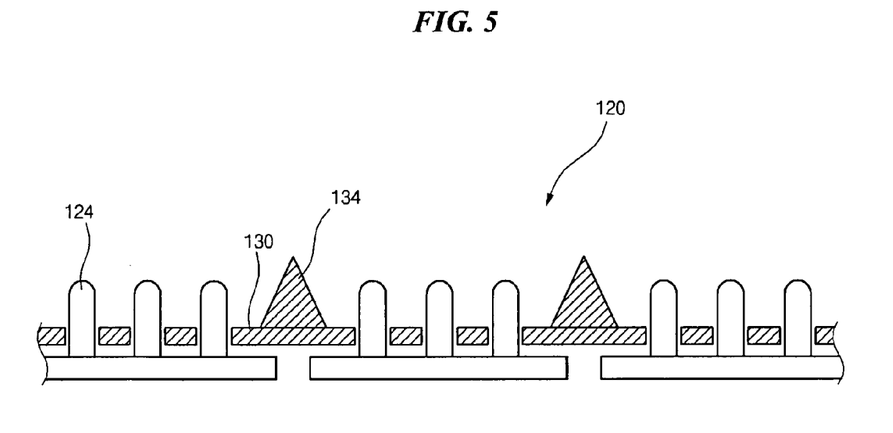
FIG. 5 is a schematic cross-sectional view of a backlight assembly according to the present invention.

FIG. 5 is a schematic cross-sectional view of a backlight assembly according to an embodiment of the present invention. The LEDs 124 of FIG. 5 correspond to a side emitting type LED. Due to the shape of the sidewall 134 on the reflective sheet 130, the sidewall reflects light from the LEDs toward the liquid crystal panel. Thus, light from the LEDs 124 can be concentrated onto the liquid crystal panel. Accordingly, light efficiency of the backlight assembly 120 is higher than that of the related art. The sidewall 134 can have other different cross-sectional shapes, such as a double-sided sidewall. Thus, the cross-sectional view and the angles of the sides of a differently shaped sidewall will be different from the above-explained embodiment.

Figure 6:
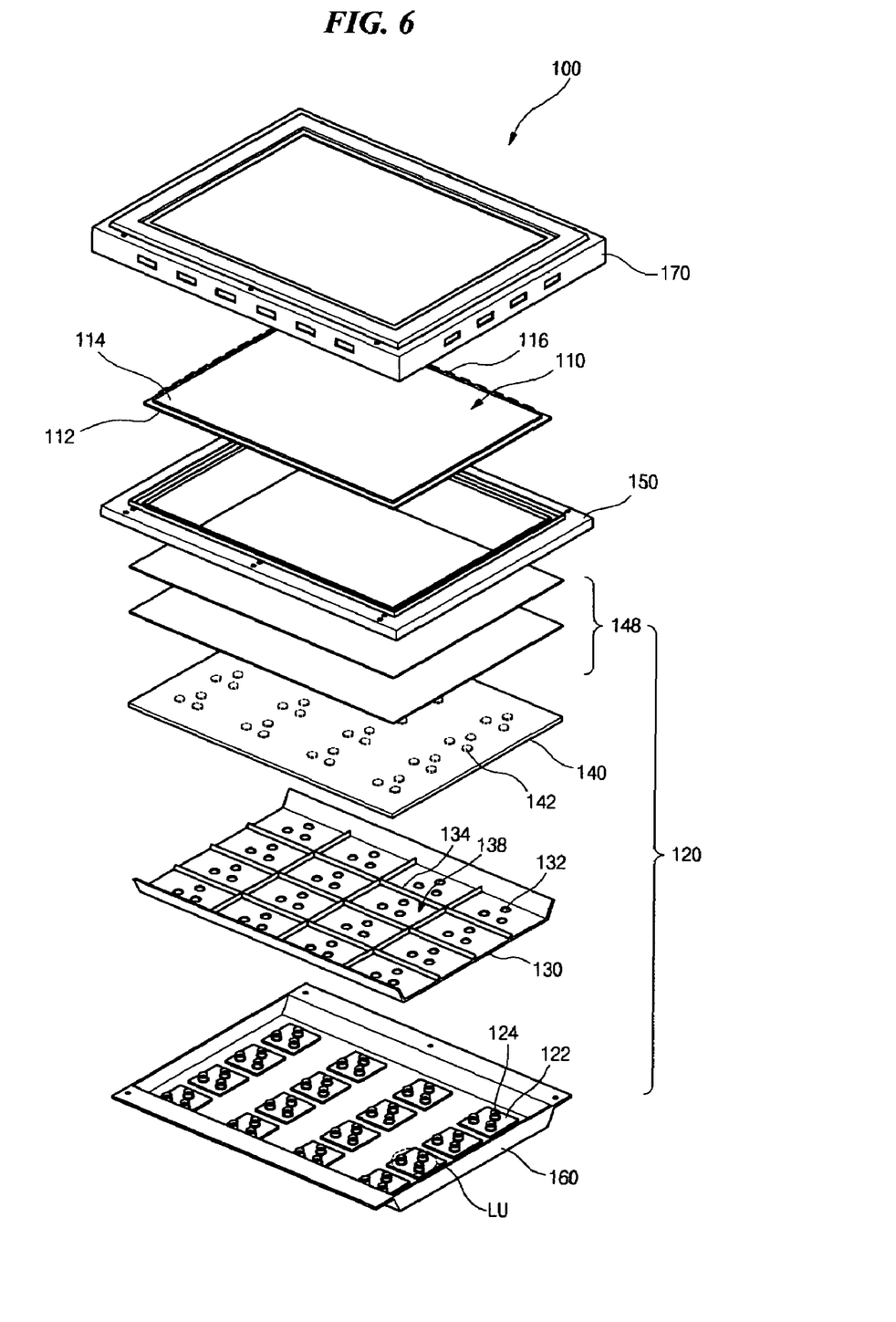
FIG. 6 is an assembly view showing an LCD module including a backlight assembly with diverters on a window according to an embodiment of the present invention.

FIG. 6 is an assembly view showing an LCD module including a backlight assembly with diverters on a window according to an embodiment of the present invention. Elements of FIG. 6 similar to those shown in FIG. 3 that have already been described above, will not be described again. As shown in FIG. 6, a transparent window 140 is interposed between the LEDs 124 protruding from the reflective sheet 130 toward the optical sheets 148. A plurality of diverters 142 is disposed on a backside of the transparent window 140 so as to be directly over the LEDs 124. The diverters 142 may be formed of a sheet material having a white or silver color. Each of the diverters 142 corresponds to each of the LEDs 124 in each of the LED units "LU." The diverters 142 reflect and diffuse linear light from the LED 124 to obtain a uniform surface light source and an improved color mixing between the LEDs 124. The sidewall are disposed under the diverters 142, which also assist in obtaining a uniform light source and improved color mixing between the LEDs 124. Further, the sidewalls 134 can support the transparent window 140 so that a predetermined distance can be maintained between the optical sheets 148 and the LEDs 124.

The LEDs 124 emit predetermined colors within one LED unit "LU" of the lattice shape 138 defined by the sidewall 134. For example, the LED unit "LU" may include RGB LEDs in a row or RGB LEDs repeatedly arranged in a row such as GRBG LEDs, RGGB LEDs, or GRBGR LEDs. That is, the LED unit "LU" may include the LEDs 124 in at least one row. Further, the LED unit "LU" may include RGB LEDs in a triangular pattern, GRBG LEDs or RGGB LEDs in a square pattern, or GRGR LEDs disposed at four vertexes of a square pattern with one B LED at a central portion of the square pattern. Different patterns can be used in different LED units "LU". Further, a white (W) LED can be included along with the RGB LEDs in the LED units "LU". Although the patterns discussed above pertain to color mixing, similar patterns may be used for LED units with just a single color of LEDs, such as white LEDs. Further, other patterns with different arrangements or a different number of LEDs can be used.

Figure 7A:
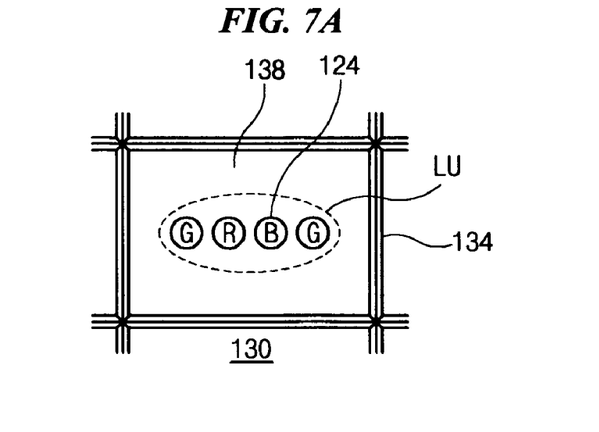
Figure 7B:
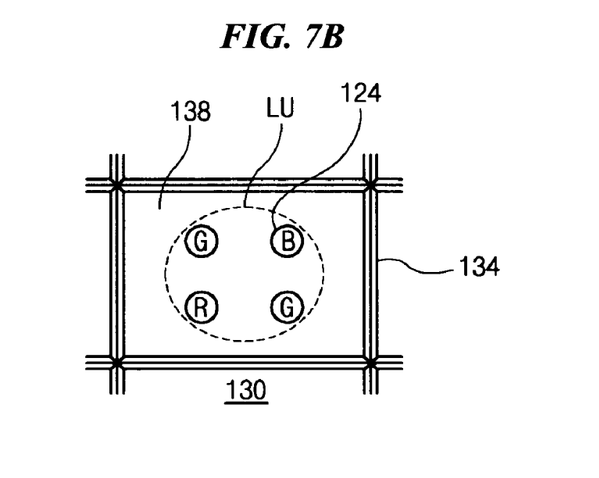
Figure 7C:
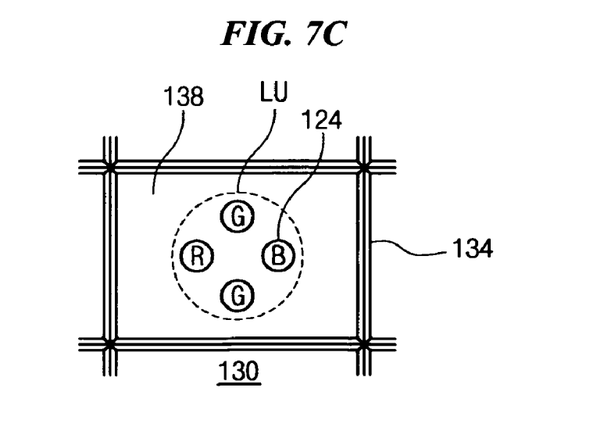
Figure 7D:
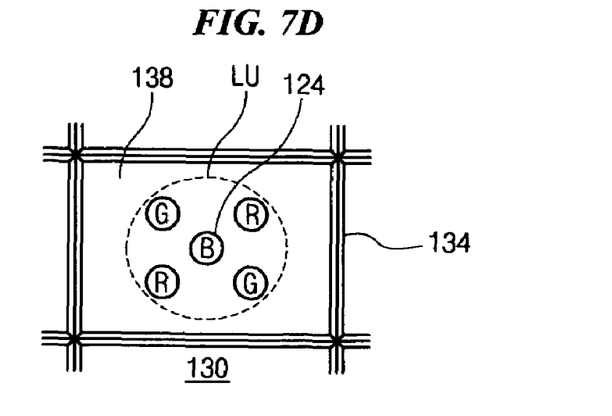
Figure 7E:
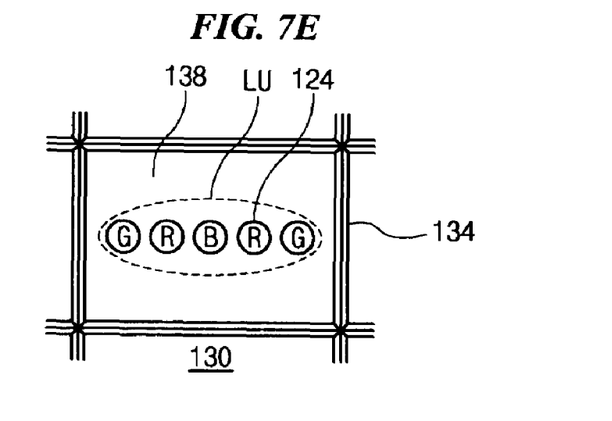
Figure 7F:
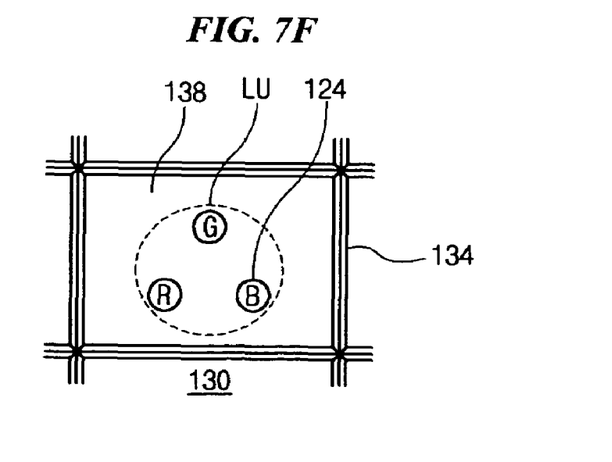
Figure 7G:
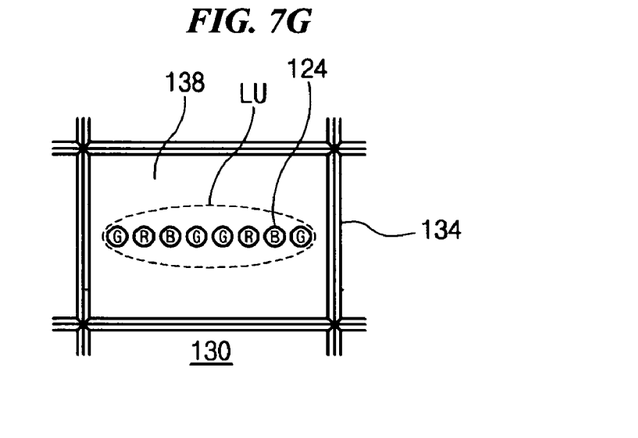
Figure 7H:
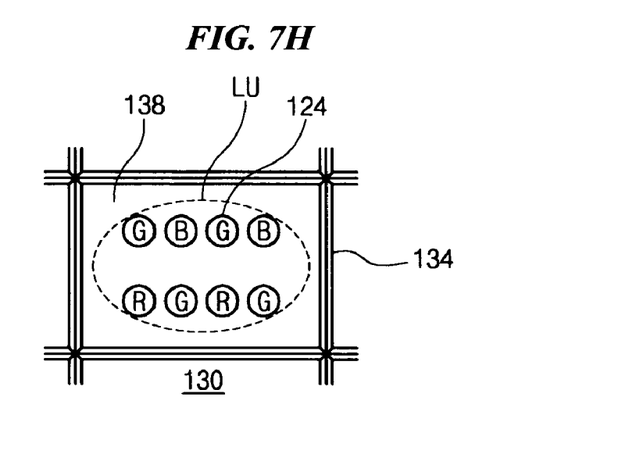
Figure 7I:
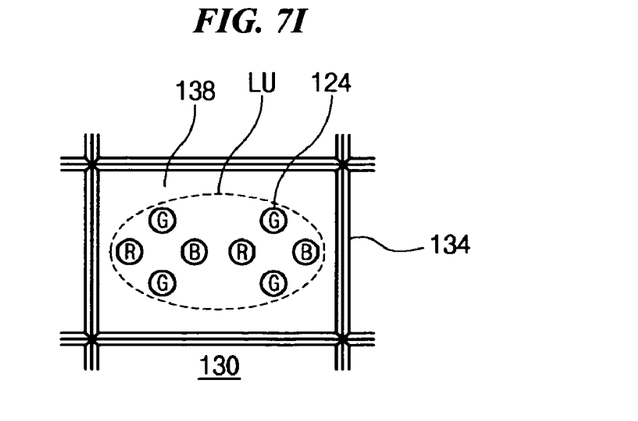
Figure 7J:
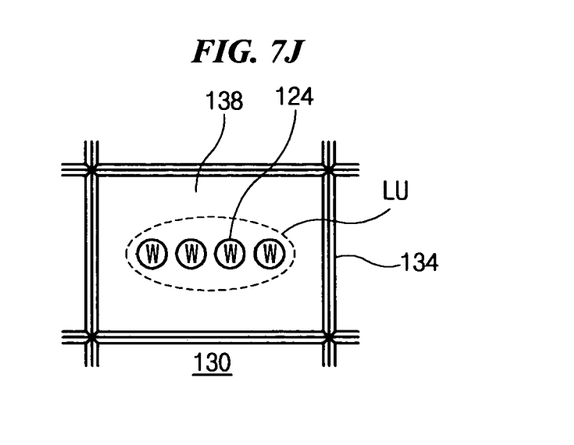

FIGS. 7A to 7J are schematic plan views showing configurations according to embodiments of the present invention. As shown in FIGS. 7A to 7J, the LED unit "LU" can include LEDs 124 in a variety of patterns. The LED unit "LU" is surrounded by the sidewall 134 having a lattice shape 138. The LEDs 124 of the LED unit "LU protrude through the reflective sheet 130. The LED unit "LU" includes GRBG LEDs arranged in a row as shown in FIG. 7A, GRBG LEDs having a square shape as shown in FIG. 7B, GRBG LEDs having a diamond shape as shown in FIG. 7C, or GRBGR LEDs disposed at four vertexes and one central portion of a square shape as shown in FIG. 7D. Alternatively, the LED unit "LU" includes one of GRBRG LEDs arranged in a row as shown in FIG. 7E, GRB LEDs having a triangle shape as shown in FIG. 7F, GRBG LEDs repeated twice arranged in a row as shown in FIG. 7G, GBRG LEDs having a square shape repeated twice arranged in a row as shown in FIG. 7H, or GRBG LEDs having a diamond shape repeated twice arranged in a row as shown in FIG. 7I. In another alternative, all of the LEDs can be white (W) LED as shown in FIG. 7J. For example, four white (W) LEDs arranged in a row. Other patterns of white (W) LEDs can be implemented, such as in a square shape, a diamond shape or other patterns as described above.

Figure 8:
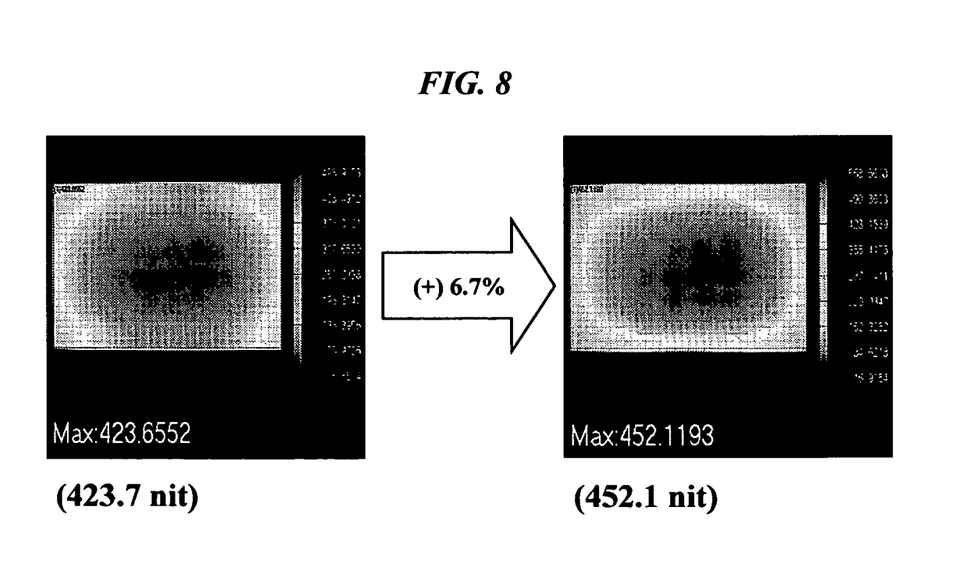
FIG. 8 shows the difference between an average brightness of a backlight assembly according to the present invention and a backlight assembly of the related art.

FIG. 8 shows the difference between an average brightness of a backlight assembly according to the present invention and a backlight assembly of the related art. FIG. 8 shows a first photo disposed at a left side and a second photo disposed at a right side. The first photo shows average brightness of a backlight assembly according to the related art, which is about 423.7 nit. However, average brightness according to an embodiment of the present invention in the second photo has higher value, 452.1 nit, than that of the related art. Thus, the data shows that average brightness is increased by 6.7% by embodiments of the present invention. Accordingly, the backlight assembly according to embodiments of the present invention improves light efficiency.

A backlight assembly and an LCD module having the backlight assembly of the embodiments of the present invention have high brightness and uniform light distribution. By using the sidewall 134 to divide the plurality of LEDs 124 into a plurality of LED units "LU", a bright white light can be provided to the liquid crystal panel 110. Further, the backlight assembly 120 and the LCD module 100 having the backlight assembly 120 can be driven by a divisional driving method.

It will be apparent to those skilled in the art that various modifications and variations can be made in a liquid crystal display device of the present invention without departing from the spirit or scope of the invention. Thus, it is intended that the present invention cover the modifications and variations of this invention provided they come within the scope of the appended claims and their equivalents.

What is claimed is:

1. A backlight assembly, comprising:
   light emitting diodes in patterns;
   a reflective sheet having a plurality of through holes through which the light emitting diodes protrude; and
   a sidewall dividing the patterns into a plurality of light emitting diode units each including at least three light emitting diodes which emit red, green and blue colored lights respectively, wherein the sidewall is disposed between the plurality of light emitting diode units to surround each of the divided light emitting diode units, and the sidewall includes an opaque reflective material,
   wherein the sidewall is disposed on the reflective sheet, and
   wherein each of the through holes corresponds to each of the light emitting diodes.

2. The backlight assembly according to claim 1, wherein the sidewall has a cross-sectional shape in which a width of the sidewall gradually decreases from the reflective sheet.

3. The backlight assembly according to claim 2, wherein the cross-sectional shape is one of a triangle and a trapezoid.

4. A backlight assembly, comprising:
   light emitting diodes emitting at least three colors and positioned in light emitting diode units;
   a reflective sheet having a plurality of holes, the light emitting diodes protruding through the holes; and
   a sidewall disposed between the light emitting diode units and bounding each of the light emitting diode units, wherein the sidewall includes an opaque reflective materials,
   wherein the sidewall is disposed on the reflective sheet, and
   wherein each of the through holes corresponds to each of the light emitting diodes.

5. The backlight assembly according to claim 4, wherein the sidewall has a cross-sectional shape in which a width of the sidewall gradually decreases from the reflective sheet.

6. The backlight assembly according to claim 5, wherein the cross-sectional shape is one of a triangle and a trapezoid.

7. The backlight assembly according to claim 4, wherein the sidewall has a lattice shape.

8. The backlight assembly according to claim 6, wherein each of the light emitting diode units include at least one red light emitting diode, at least one green light emitting diode and at least one blue light emitting diode.

9. The backlight assembly according to claim 4, wherein each of the light emitting diode units include a white light emitting diode.

10. The backlight assembly according to claim 4, further comprising:
    at least one printed circuit board where the light emitting diodes are mounted; and
    an optical sheet disposed over the light emitting diodes.

11. The backlight assembly according to claim 10, further comprising:
    a transparent window interposed between the light, emitting diodes and the optical sheet; and
    diverters under the transparent window and facing the light emitting diodes so as to correspond to each of the light emitting diodes.

12. The backlight assembly according to claim 4, wherein each of the light emitting diode units includes one of a straight shape, a triangular shape, a square shape, and a shape such that four light emitting diodes are disposed at four vertexes of the shape and one light emitting diode is disposed at a central position of the shape.

13. The backlight assembly according to claim 4, wherein the light emitting diodes are driven by a division driving method.

14. The backlight assembly according to claim 4, wherein the light emitting diodes are side emitting type light emitting diodes.

15. A liquid crystal display module, comprising:
    a backlight assembly having light emitting diodes three emitting at least three colors and positioned in light emitting diode units, a reflective sheet having a plurality of holes, the light emitting diodes protruding through the plurality of holes, and a sidewall that bounds each of the light emitting diode units;
    a bottom frame on which the backlight assembly is disposed;
    a liquid crystal panel disposed over the backlight assembly;
    a main frame surrounding the liquid crystal panel and the backlight assembly; and
    a top frame surrounding a front edge of the liquid crystal panel,
    wherein the sidewall is disposed on the reflective sheet, and
    wherein each of the holes corresponds to each of the light emitting diodes.

* * * * *